UNITED STATES PATENT OFFICE.

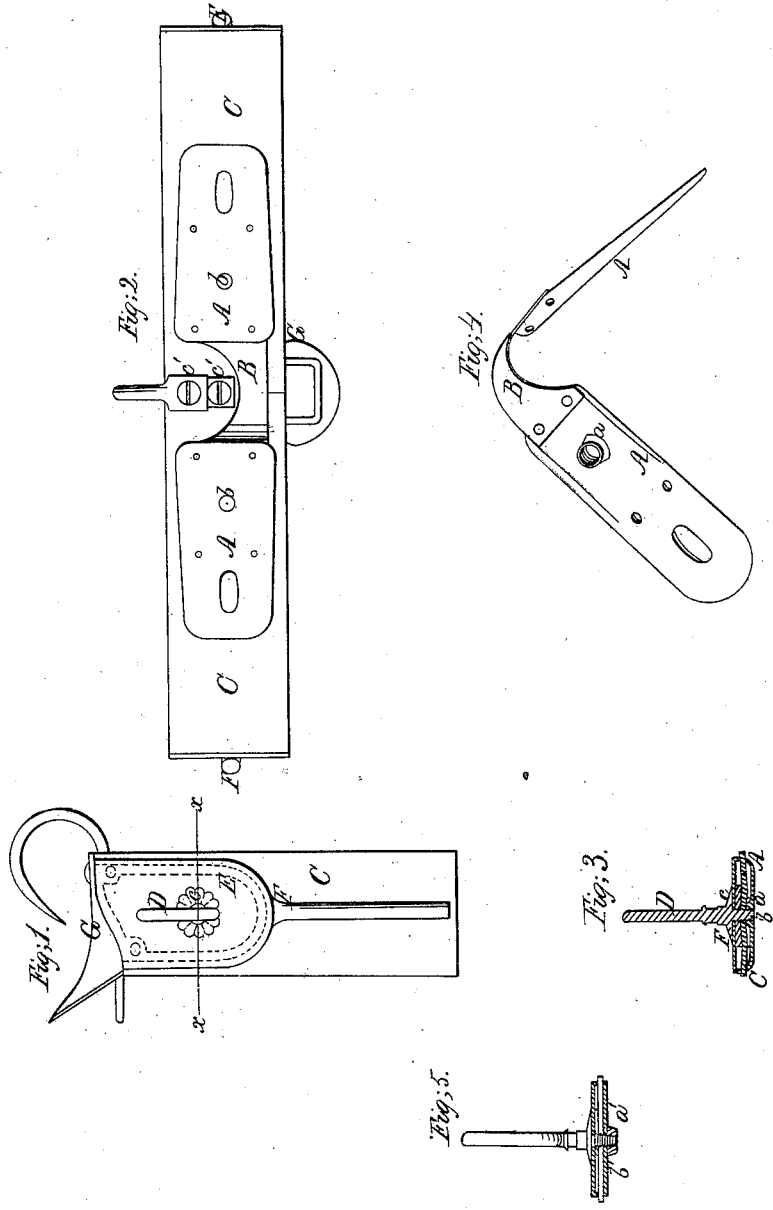

SAMUEL E. TOMPKINS, OF NEWARK, NEW JERSEY.

IMPROVEMENT IN HARNESS-SADDLE TREES.

Specification forming part of Letters Patent No. 45,850, dated January 10, 1865.

*To all whom it may concern:*

Be it known that I, SAMUEL E. TOMPKINS, of Newark, in the county of Essex and State of New Jersey, have invented a new and Improved Harness or Gig Saddle Tree; and I do hereby declare that the following is a full, clear, and exact description thereof, which will enable those skilled in the art to make and use the same, reference being had to the accompanying drawings, forming part of this specification, in which—

Figure 1 is a side view of my invention; Fig. 2, an under view or an inverted plan of the same; Fig. 3, a transverse section of the same, taken in the line $x$ $x$, Fig. 1; Fig. 4, a detached perspective view of the bearings pertaining to the same; Fig. 5, a transverse section of a saddle-tree now in use, and which approaches nearer to mine than any other. This view is drawn for the purpose of clearly showing the difference between the two trees.

Similar letters of reference indicate corresponding parts.

This invention relates to an improvement in that class of harness or gig saddle trees which are of iron, and are provided with iron jockeys. The object of the invention is to do away with nuts and all projections whatever at the under side of the tree which would have a tendency to injure or "gall," as it is technically termed, the horse's back, and at the same time have the bearings of the tree so formed or constructed that they will serve the double function of bearings and clamps, and afford ample room for the back band and flaps and admit of the saddle having a chaste and neat appearance.

A A represent the two bearings of the tree. (See Figs. 2 and 4.) These bearings may be of cast-iron, or they may be swaged or struck up out of wrought metal or rolled metal plates. Their under surfaces are rounded or made convex, so as to conform to the back of the horse, and the upper sides of the bearings are concave, corresponding to the convexity of the under surfaces. (See Fig. 3.) The two bearings A A are connected together by a thin piece of metal plate, B, which is curved in semicircular or an approximate form, as shown clearly in Fig. 4, and serves as a support for the leather flaps C C. The inner concave surfaces of the bearings A A are provided with projections $a$, which have internal screw-threads to serve as nuts to receive the screws $b$ of the terrets D. The concave form of the inner sides of the bearings admits of these nuts being on the inner sides of the bearings without having them interfere with the flaps or back-band, for the upper edges of the nuts need not project above the level of the edges of the bearings A A, while the concave upper surfaces of the latter admit of the flaps and back-band being pressed, to a certain extent, downward within them as the screws $b$ of the terrets are screwed into the nuts $a$. (See Fig. 3.)

E represents the jockeys, which are of cast-iron and are fitted or placed over the leather flaps C C, the screws $b$ of the terrets passing through the jockeys and having shoulders $c$ at their upper parts, which bear on the upper surfaces of the jockeys. (See Figs. 1 and 3.

F represents the back-band, the ends of which are inserted between the jockeys and the flaps, the terret-screws $b$ passing through them. By this arrangement it will be seen that the bearings A A and jockeys E E serve as clamps under the screws of the terrets, and firmly hold the flaps and back-band in position, and at the same time, owing to the concave form of the upper surfaces of the bearings, these parts are made to assume a snug position relatively with each other, so as to give a chaste and neat appearance to the saddle while the inside terret-nuts, $a$—the most important feature of all—obviate the necessity of any projections whatever at the under side of the tree, and hence the back of the horse cannot be injured or "galled," as is the case, to a greater or less extent, with the ordinary saddles of this class. (See Fig. 5, in which the terret-nuts $a'$ are shown at the under sides of the bearings $b'$.)

The seat G in my invention is made or cast separate from the jockeys, and is secured to them by screws $c'$, as shown in Fig. 2.

Cast-iron would of course be the material used for the metal parts herein described, as it is the most economical and answers every purpose of brass or other more expensive metal. I do not confine myself, however, to iron, as other metals may be used.

Having thus described my invention, I claim as new and desire to secure by Letters Patent—

The two bearings A A, connected together by a thin strip or plate, B, made of convex form at their under sides, to correspond to the shape of the back of the animal, and having a corresponding concave surface at their upper sides, when said bearings thus formed and connected together are provided with nuts $a$ at their upper surfaces to receive the terret-screw $b$, and all used in connection with the metal jockeys E E, flaps C, and back-band F, substantially as herein set forth.

SAML. E. TOMPKINS.

Witnesses:
M. M. LIVINGSTON,
THEO. TUSCH.